US012665152B2

(12) United States Patent
Jia et al.

(10) Patent No.: US 12,665,152 B2
(45) Date of Patent: Jun. 23, 2026

(54) RESET MODULE FOR HANDLE MECHANISM, HANDLE MECHANISM AND SWITCHING DEVICE

(71) Applicant: Schneider Electric (China) Co., Ltd., Beijing (CN)

(72) Inventors: Shiyang Jia, Beijing (CN); Shunxian Mao, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 287 days.

(21) Appl. No.: 18/545,493

(22) Filed: Dec. 19, 2023

(65) Prior Publication Data

US 2025/0157773 A1 May 15, 2025

(30) Foreign Application Priority Data

Nov. 14, 2023 (CN) ......................... 202323075408.9

(51) Int. Cl.
*H01H 71/52* (2006.01)

(52) U.S. Cl.
CPC ................................. *H01H 71/521* (2013.01)

(58) Field of Classification Search
CPC ............. H01H 9/22; H01H 2009/0088; H01H 2009/0094; H01H 71/465; H01H 71/521; H01H 71/52
USPC ..... 200/17 R, 179, 19.18, 50.34, 61.46, 529, 200/570, 273, 316, 336; 218/1
See application file for complete search history.

(56) References Cited

U.S. PATENT DOCUMENTS 3,697,714 A * 10/1972 Gryctoko ................. H01H 3/08 200/337
5,493,084 A * 2/1996 Whitaker ................. H01H 9/22 200/50.05
9,396,886 B2 * 7/2016 Reinhart .................. H01H 9/04
(Continued)

FOREIGN PATENT DOCUMENTS

CN 110120326 A 8/2019
EP 2460172 B1 7/2013
(Continued)

OTHER PUBLICATIONS

Translation of WO2011012806 (Original document published Feb. 3, 2011). (Year: 2011).*
(Continued)

*Primary Examiner* — William A Bolton
(74) *Attorney, Agent, or Firm* — FIG. 1 Patents

(57) ABSTRACT

Embodiments of the disclosure provides a reset module for a handle mechanism, a handle mechanism and a switching device. The reset module comprises: a rotary table fixedly coupled to a rotary handle of the handle mechanism and adapted to rotate with the rotary handle about a rotary axis at least between a closed position and an open position; a first driving block arranged at a circumferential edge of the rotary table and adapted to contact a joystick of a circuit breaker during rotation of the rotary table from the closed position to the open position; and an elastic member coupled to the rotary table and adapted to provide an elastic force between the first driving block and the joystick such that the rotary table is held in the closed position. In this way, the rotary handle can accurately indicate the current state of the switching device.

16 Claims, 12 Drawing Sheets

(56) References Cited

U.S. PATENT DOCUMENTS

| | | | | | |
|---|---|---|---|---|---|
| 9,679,733 | B2 * | 6/2017 | Dunker | H01H 9/223 |
| 10,312,046 | B1 * | 6/2019 | Clark | H01H 9/282 |
| 10,361,053 | B2 * | 7/2019 | Roopnarine | H01H 33/48 |
| 11,145,479 | B2 * | 10/2021 | Burkett | H01H 71/56 |
| 2014/0346021 | A1 * | 11/2014 | Baek | H01H 71/56<br>200/336 |

FOREIGN PATENT DOCUMENTS

| | | | | | |
|---|---|---|---|---|---|
| KR | 20160113908 | A | | 10/2016 | |
| WO | WO2011012806 | A1 | * | 2/2011 | H01H 71/10 |

OTHER PUBLICATIONS

Translation of KR101676736 (Original document published Nov. 17, 2026. (Year: 2016).*

Translation of CN110120326 (Original document published Aug. 13, 2019) (Year: 2019).*

Extended European Search Report dated May 15, 2024 for corresponding European Patent Application No. 23217975.4-1201, 9 pages.

* cited by examiner

RESET MODULE FOR HANDLE MECHANISM, HANDLE MECHANISM AND SWITCHING DEVICE

CROSS-REFERENCE

This application claims the benefit of Chinese Patent Application No. 202323075408.9, filed on Nov. 14, 2023, entitled "RESET MODULE FOR HANDLE MECHANISM, HANDLE MECHANISM AND SWITCHING DEVICE", which is hereby incorporated by reference in its entirety.

FIELD

Embodiments of the present disclosure generally relate to the field of electrical equipment, and more specifically, to a reset module for a handle mechanism, a handle mechanism and a switching device.

BACKGROUND

In existing switching device, the handle that controls a joystick of a switching device often has an idle stroke area. This means that when the rotary handle is rotated to left or right, there is a range of rotation gaps, and the handle will not actually change the switching device within this idle stroke area. However, this idle stroke area makes the handle unable to accurately indicate the current position of the handle. For example, when the handle has controlled the joystick to reach the closed position, the handle can still rotate within a certain range without even contacting or controlling the joystick. In this case, the handle is easy to rotate to a position that deviates from a position for indicating the closed state, which makes it easy for the user to misjudge the current state of the switching device.

SUMMARY

In a first aspect of the present disclosure, there is provided a reset module for a handle mechanism. The reset module comprises: a rotary table fixedly coupled to a rotary handle of the handle mechanism and adapted to rotate with the rotary handle about a rotary axis at least between a closed position and an open position; a first driving block arranged at a circumferential edge of the rotary table and adapted to contact a joystick of a circuit breaker during rotation of the rotary table from the closed position to the open position and to push the joystick from an on position to an off position; and an elastic member coupled to the rotary table and adapted to provide an elastic force between the first driving block and the joystick during the rotary table being in the closed position such that the rotary table is held in the closed position.

In some embodiments, the elastic member comprises: a coupling portion fixedly coupled to the rotary table; and a deforming portion coupled to the coupling portion and arranged to press against the joystick at least during the rotary table being in the closed position.

In some embodiments, the rotary table further comprises a fixing groove passing through a center of the rotary table and extending radially toward the first driving block, the fixing groove adapted to receive the coupling portion.

In some embodiments, the reset module further comprising: a fastener coupled to the coupling portion and configured to couple the coupling portion into the fixing groove.

In some embodiments, the reset module further comprising: a second driving block arranged at the circumferential edge of the rotary table and spaced circumferentially by a predetermined angle from the first driving block, the second driving block adapted to contact the joystick during rotation of the rotary table from the open position to the closed position and to push the joystick from the off position to the on position.

In some embodiments, the fastener passes simultaneously through the rotary table and the rotary handle, and is respectively coupled to the rotary table and the rotary handle to fix the rotary table on the rotary handle.

In some embodiments, the reset module further comprising: a microswitch coupled to a housing of the handle mechanism and adapted to be triggered by the first driving block during the rotary table being in the closed position.

According to embodiments of the present disclosure, the elastic member may provide an elastic force to the rotary table, so that the first driving block of the rotary table and the joystick of the circuit breaker are spaced apart by a predetermined distance. In this way, the movement of the rotary handle coupled to the rotary table may have an idle stroke distance, and the rotary handle may also be held in the termination position (e.g., the closed position) under the action of the elastic member, so that the rotary handle can accurately indicate the current state of the switching device.

In a second aspect of the present disclosure, there is provided a handle mechanism. The handle mechanism comprises: a housing coupled to a shell of a switching device; a rotary handle rotatably coupled outside the housing; and a reset module provided in accordance with a first aspect of the present disclosure.

In some embodiments, the handle mechanism further comprising: a locking member, movably coupled to the rotary handle, wherein the shell further comprises at least one location hole, the locking member adapted to be driven and at least partially inserted into the location hole, to secure the rotary handle to the shell.

In some embodiments, the handle mechanism further comprising: a driving assembly adapted to control insertion of a locking member (23) into the location hole and comprising: a rotary knob coupled to the rotary handle; and a driving member coupled between the rotary knob and the locking member, and adapted to drive the locking member to be inserted into the location hole with rotation of the rotary knob.

In a third aspect of the present disclosure, there is provided a switching device. The switching device comprises: a circuit breaker, comprising a joystick for controlling on and off of a circuit breaker; and a handle mechanism provided according to the second aspect of the present disclosure.

It should be understood that the content described in this section is not intended to limit critical or important features of embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference signs represent the same or similar elements, where.

DETAILED DESCRIPTION

Figure 1:
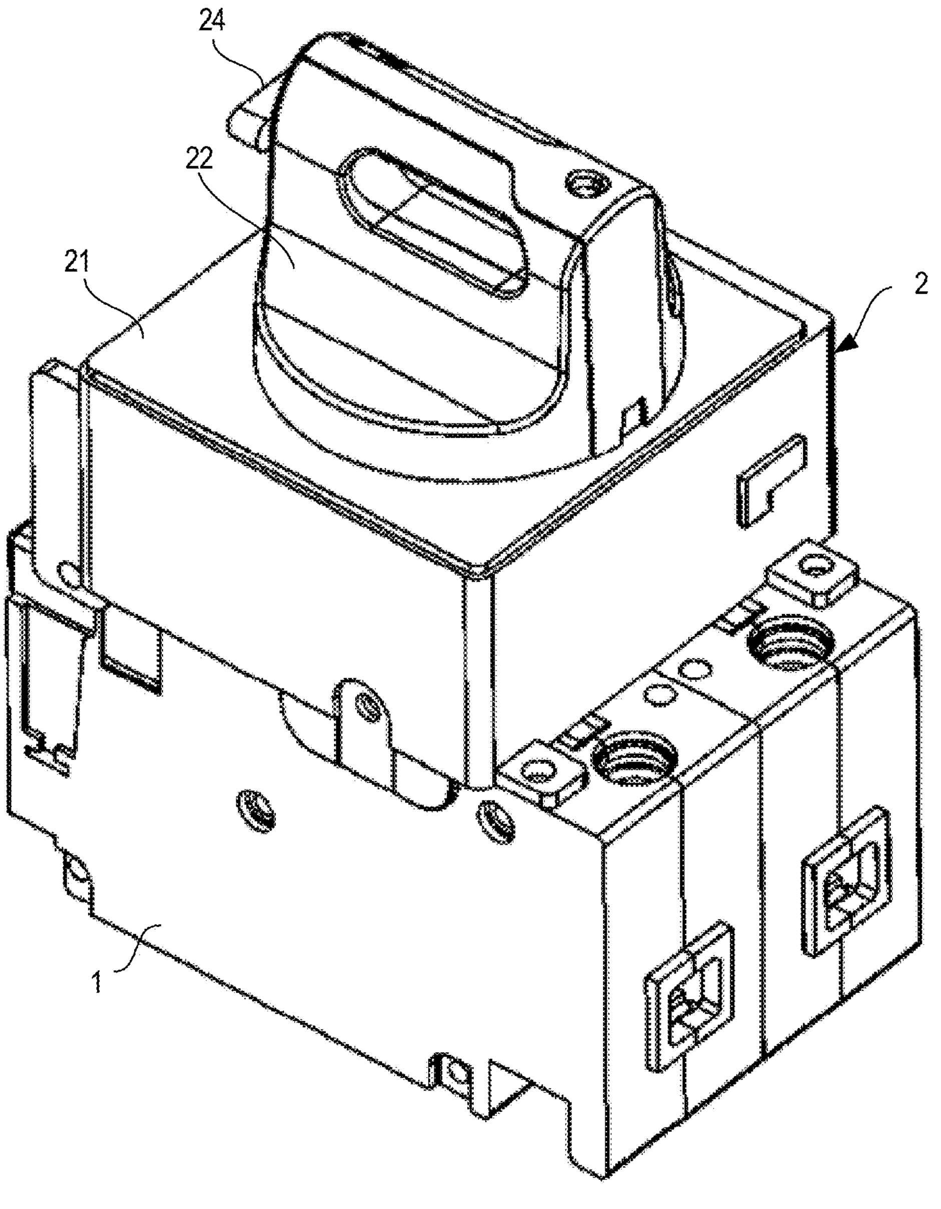
FIG. 1 shows a schematic diagram of the overall structure of a switching device according to embodiments of the present disclosure.

Embodiments of the present disclosure will be described in more detail below with reference to the accompanying drawings. Although certain embodiments of the disclosure are illustrated in the drawings, it should be understood that the present disclosure may be embodied in various forms and should not be construed as limited to embodiments set forth herein, but rather, these embodiments are provided for a more thorough and complete understanding of the present disclosure. It should be understood that the drawings and embodiments of the present disclosure are for illustrative purposes only and are not intended to limit the scope of the present disclosure.

It should be noted that the titles of any section/sub-section provided in this article are not restrictive. Various embodiments are described throughout this article, and any type of embodiment can be included under any section/sub-section. In addition, the embodiments described in any section/sub-section can be combined in any way with any other embodiments described in the same section/sub-section and/or different sections/sub-sections.

In the description of embodiments of the present disclosure, the term "comprise(s)" and its variants used herein indicate open inclusion, that is, "comprising but not limited to". The terms "based on" should be interpreted as "based at least in part on". The term "an embodiment" or "the embodiment" should be interpreted as "at least one embodiment". The term "some embodiments" should be interpreted as "at least some embodiments". The following may also include other explicit and implicit definitions. The terms "first", "second", etc. may refer to different or the same objects. Other explicit and implicit definitions may also be comprised below.

As briefly mentioned earlier, there is usually an idle stroke area in the handle assembly used to control the joystick of the switching device. In some cases, this idle stroke area is made to effectively trigger a microswitch. Specifically, in the handle assembly used to control the switching device, in order to more quickly indicate the status of the switching device, a microswitch is usually provided. In the handle assembly, an idle stroke segment for triggering the microswitch in advance is often added to the stroke of the rotary handle. In addition, in some switching device, the final position of the handle rotary is also as a part of the status indication. The existence of the idle stroke segment may cause the rotary handle to fail to accurately indicate the termination position, which may cause misjudgment of the termination position about the switching device, causing inconvenience or even danger to users. Therefore, it is necessary for the rotary handle to remain in the termination position (such as the closed position) under an external force.

Embodiments of the present disclosure by providing a reset module for a handle mechanism, a handle mechanism and a switching device to solve or at least partially solve the above problems and other potential problems present in the conventional solution. According to various embodiments of the present disclosure, the elastic member can provide an elastic force between the first driving block and the joystick of the circuit breaker, thereby providing an elastic force to the rotary table according to the relationship between the force and the action force. In this way, the rotary table does not rotate due to the idle stroke distance between the first driving block and the joystick of the circuit breaker, so that the rotary table and the rotary handle can remain in the termination position (e.g., the closed position), so that the rotary handle can accurately indicate the current state of the switching device.

Figure 2:
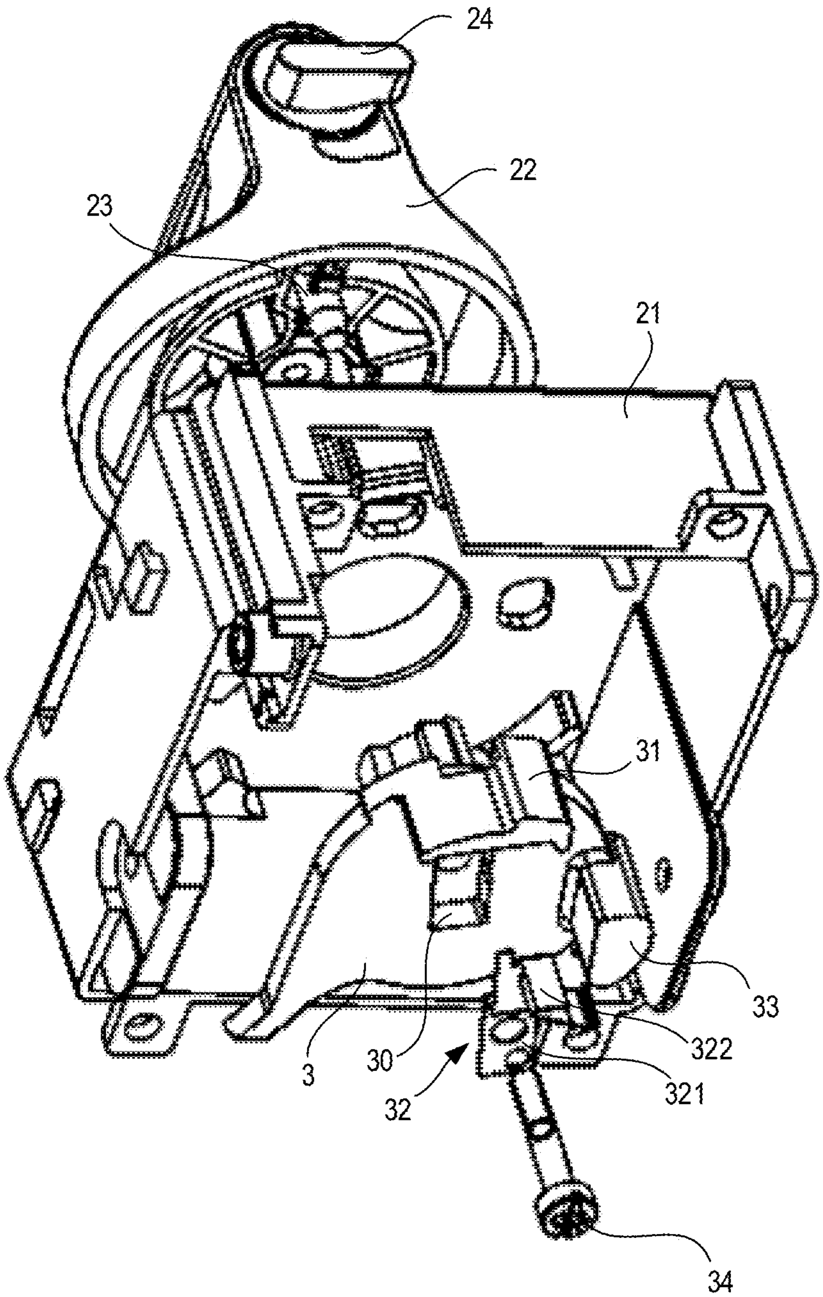
FIG. 2 shows an exploded view of a handle mechanism according to embodiments of the present disclosure.

FIG. 1 shows a schematic diagram of the overall structure of a switching device according to embodiments of the present disclosure, and FIG. 2 shows an exploded view of a handle mechanism according to embodiments of the present disclosure. As shown in FIG. 1, the switching device generally includes a circuit breaker 1 and a handle mechanism 2. The circuit breaker 1 includes a joystick 11, which can swing between an on position and an off position to thereby control the circuit breaker 1 to perform a corresponding on or off operation. The handle mechanism 2 is coupled to the circuit breaker 1 and is used to control the swinging of joystick 11 between the on position and the off position.

The handle mechanism 2 includes a housing 21 coupled to the shell of the circuit breaker 1, a rotary handle 22 arranged on the side of the shell away from the circuit breaker 1, and a reset module. The reset module is arranged in the housing 21 and coupled between the rotary handle 22 and the joystick 11. The reset module is adapted to rotate between a closed position and an open position with rotation of the rotary handle 22. When the reset module rotates between the closed position and the open position, the reset module drives the joystick 11 to swing between the on position and the off position.

In some embodiments, the handle mechanism 2 further includes a locking member 23. The locking member 23 is coupled to the rotary handle 22. Accordingly, the shell is also provided with at least two location holes corresponding to the closed position and the open position of the reset module, respectively. The locking member 23 can be inserted into one of the location holes, so that the locking member 23 locks the rotary handle 22 and the reset module in the corresponding position (the closed position or the open position). For example, when the rotary table 3 rotates to the closed position, the locking member 23 is inserted into one of the location holes corresponding to the closed position, so that the rotary handle 22 and the rotary table 3 are fixed in the closed position.

In some embodiments, the handle mechanism 2 further comprises a driving assembly coupled within the rotary handle 22 and adapted to control the locking member 23 to be inserted into or withdrawn from the location hole. The driving assembly includes a rotary knob 24 and a transmission member. The rotary knob 24 is rotatably coupled to the rotary handle 22. The transmission member is coupled between the rotary knob 24 and the locking member 23 and adapted to drive the locking member 23 in or out of the location hole with rotation of the rotary knob 24. In some embodiments, the transmission member may be a structure such as a connecting rod or a cam, etc. In some other embodiments, the transmission member may also be a structure such as a ball bearing, etc. When the rotary knob 24 is rotated, the transmission member converts the rotation of the rotary knob 24 into the sliding of the locking member 23 in an axial direction, thereby allowing the locking member 23 to be inserted in or withdrawn from the location hole.

Figure 3:
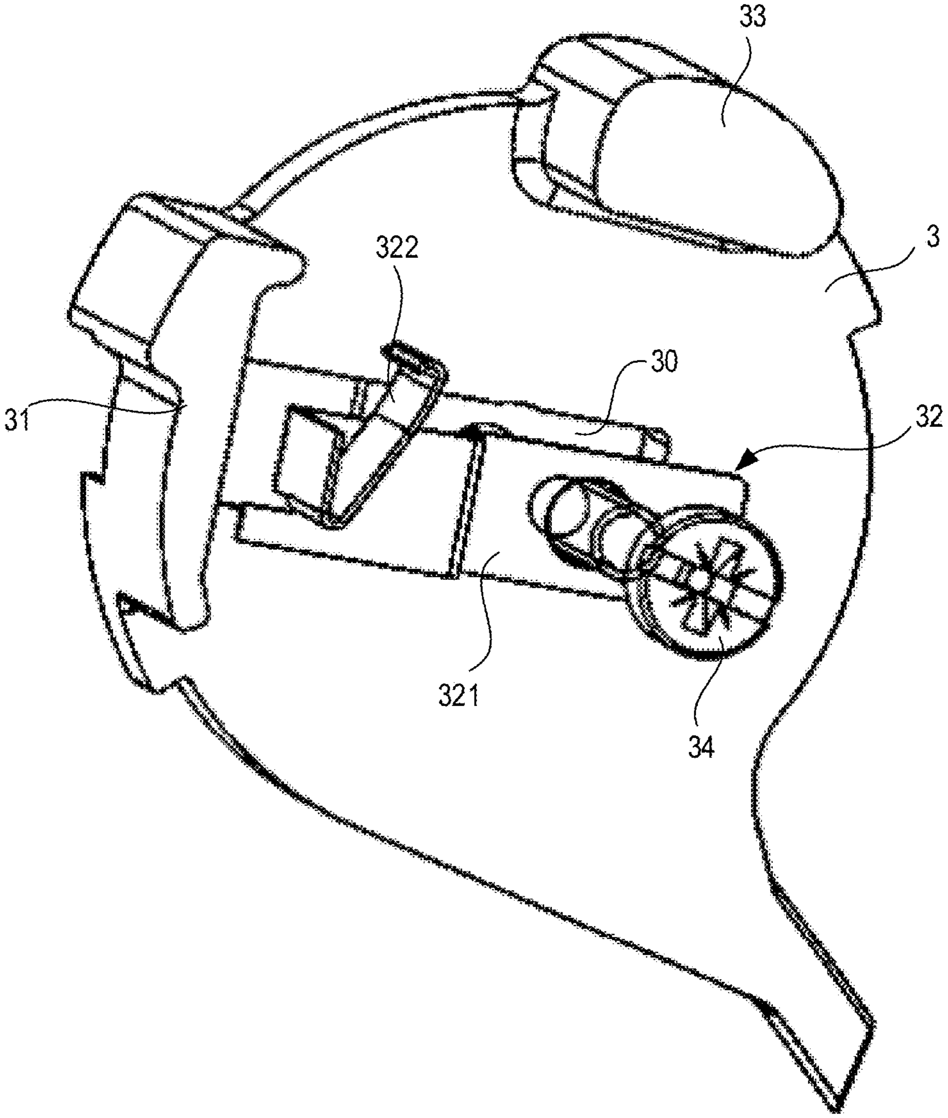
FIG. 3 shows a schematic diagram of the overall structure of the reset module according to embodiments of the present disclosure.

FIG. 3 shows a schematic diagram of the overall structure of the reset module according to embodiments of the present disclosure. As shown in FIG. 3, the reset module includes a rotary table 3 and a first driving block 31 coupled to the rotary table 3. The rotary table 3 is coupled to the rotary handle 22 so that rotary table 3 can rotate with the rotary handle 22 about a rotary axis between a closed position and an open position. In some embodiments, the rotary table 3 and the rotary handle 22 can be fixed by a fastener 34. For example, in some embodiments, the fastener 34 can be a self-tapping bolt. The self-tapping bolt penetrates the rotary table 3 from the side of the housing toward the circuit breaker 1 and is fit in the rotary handle 22 with threads. In some alternative embodiments, the rotary handle 22 and the rotary table 3 may also be fixed together by welding, bonding, and a snap connection.

The first driving block 31 is arranged at a circumferential edge of the rotary table 3 and adapted to push the joystick 11 during rotation of the rotary table 3 from the closed position to the open position, to cause the joystick 11 to be swung from the on position to the off position. In some alternative embodiments, the first driving block 31 may also be arranged at other suitable positions offset from the axis (i.e., the rotary axis) of the rotary table 3. When the rotary table 3 is rotated about the rotary axis, the position of the first driving block 31 relative to the rotary axis is changed to push the joystick 11 of the circuit breaker 1 to be swung.

Figure 4A:
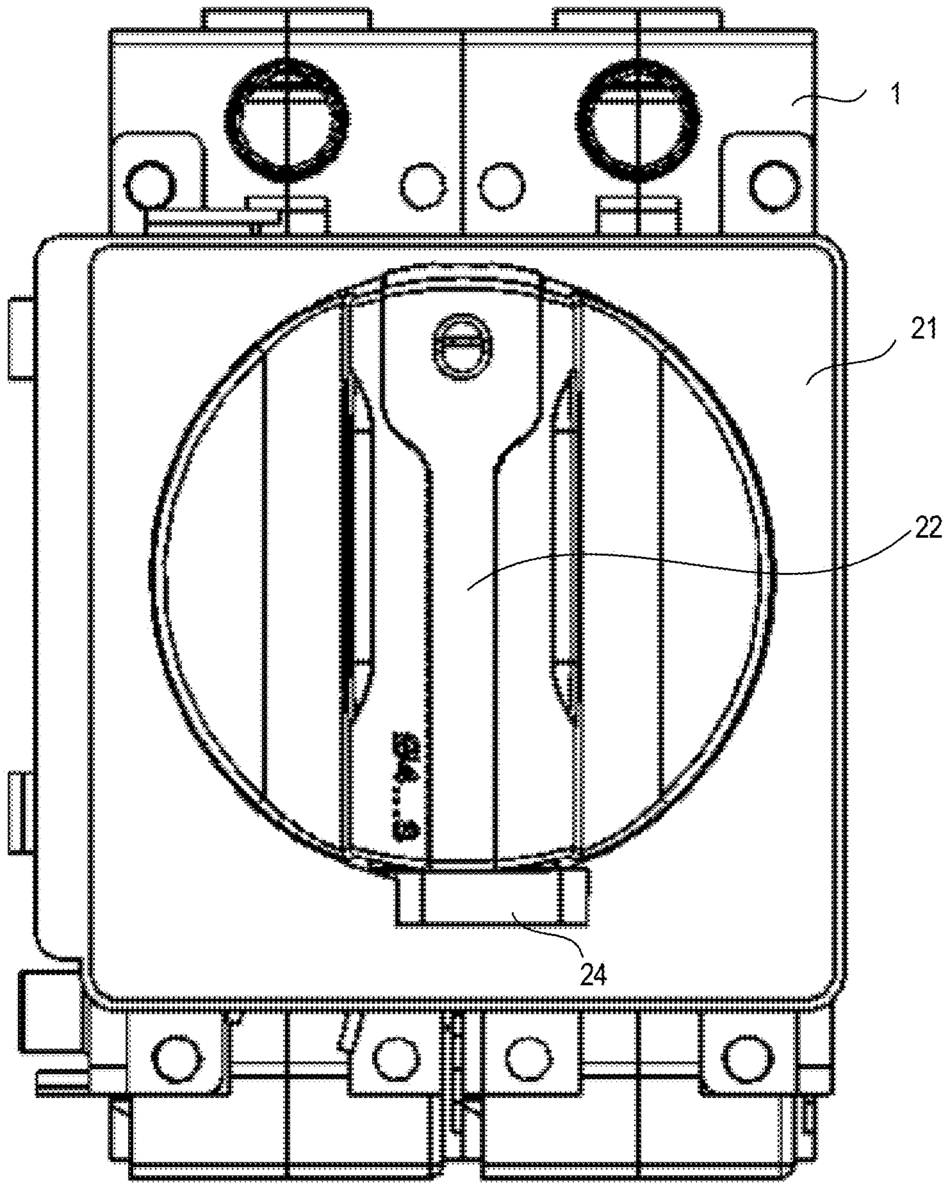
FIGS. 4A, 4B, and 4C respectively show schematic diagrams of the positional relationship between the rotary table and the joystick at different perspectives when the rotary table of the reset module according to embodiments of the present disclosure is in the closed position.
Figure 4B:
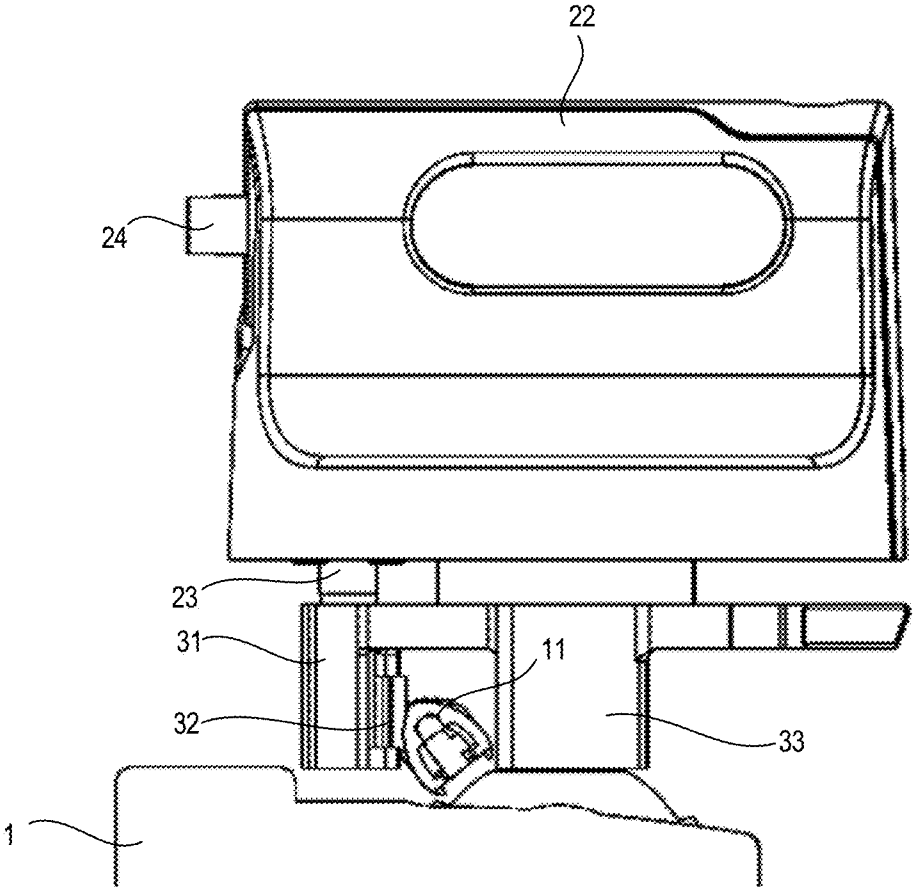
Figure 4C:
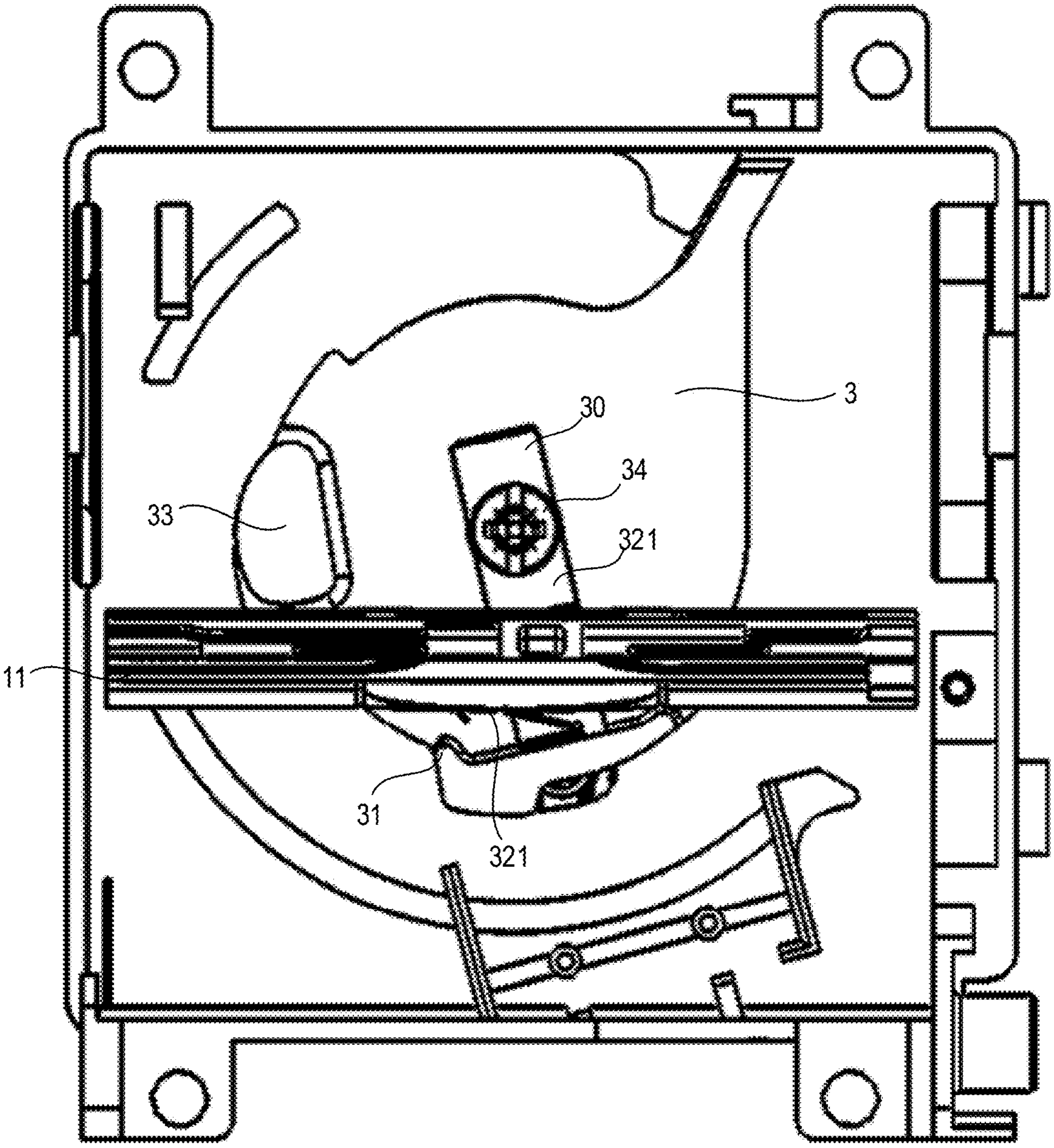

FIGS. 4A, 4B, and 4C respectively show schematic diagrams of the positional relationship between the rotary table and the joystick at different perspectives when the rotary table of the reset module according to embodiments of the present disclosure is in the closed position. As shown in FIGS. 4A, 4B, and 4C, the rotary table 3 is in the closed position, and the first driving block 31 is spaced apart from the joystick 11 by a predetermined distance. In order to accurately maintain the rotary table 3 in the closed position, the reset module further includes an elastic member 32. The elastic member 32 is coupled to the rotary table 3 and can provide an elastic force between the first driving block 31 and the joystick 11 during the closed position of the rotary table 3 so that the rotary table 3 is maintained in the closed position. In this manner, even if there is an idle stroke distance between the first driving block 31 and joystick 11, the elastic force of the elastic member 32 can effectively prevent the first driving block 31 and the entire rotary table 3 and the rotary handle from moving in a direction toward the joystick 11, so that the rotary handle can be maintained in the closed position.

In some embodiments, the elastic member 32 may include a coupling portion 321 and a deforming portion 322 coupled to the coupling portion 321. The coupling portion 321 is coupled to the rotary table 3, so that the elastic member 32 can rotate with the rotary table 3. When the joystick 11 reaches the on position, the joystick 11 contacts the deforming portion 322 and compresses the deforming portion 322, so that the elastic member 32 can push the rotary table 3 to continue rotating to the closed position under the action of the elastic force of the deforming portion 322. In addition, when the rotary table 3 is rotated to the closed position, the deforming portion 322 is still in a compressed state, so that the rotary table 3 can be maintained in the closed position. In this case, when a user needs to rotate the rotary handle 22 and control the circuit breaker 1 to be turned off, the user can apply an operating force sufficient to overcome the elastic force of the deforming portion 322 to the rotary handle 22 to rotate the rotary table 3 from the closed position to the open position.

It should be understood that the component force of elastic force of the elastic member 32 acting on the joystick 11 should be less than the minimum pushing force for driving the joystick 11 to swing from the on state to the off state, so that during the idle movement of the rotary table 3, the elastic member 32 does not push the joystick 11 to move.

As shown in FIGS. 4A, 4B and 4C, when the rotary table 3 rotates about the rotary axis from the closed position to the open position, the first driving block 31 gradually approaches the joystick 11 (this process is also called the idle movement of the rotary table 3) until the first driving block 31 contacts the joystick 11. As the rotary table 3 continues to rotate to the open position, the first driving block 31 pushes against the joystick 11 and causes the joystick 11 to swing to the off position.

Figure 5A:
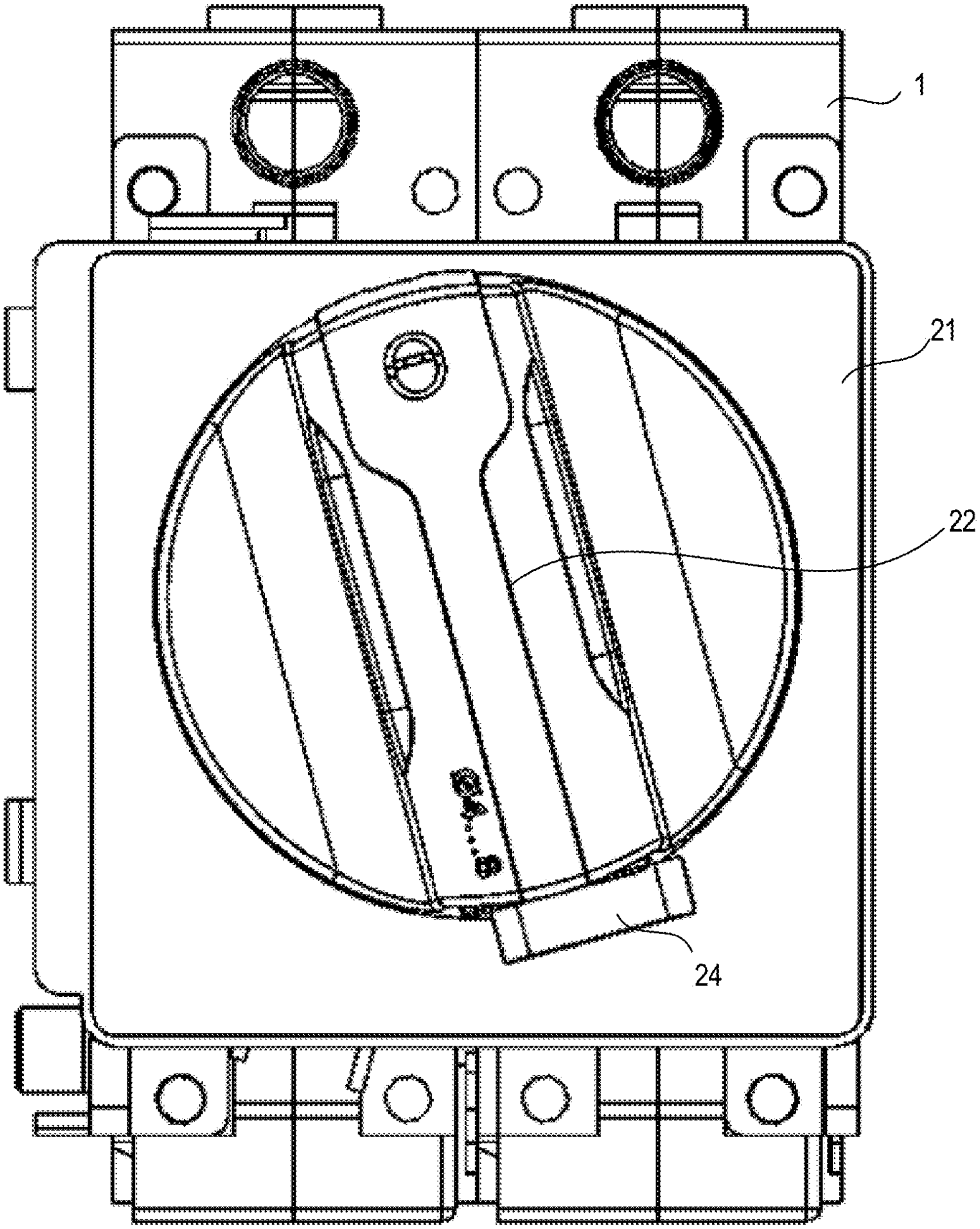
FIGS. 5A, 5B, and 5C show schematic diagrams of the positional relationship between the rotary table and the joystick at different angles when the rotary table of the reset module according to embodiments of the present disclosure is in idle motion.
Figure 5B:
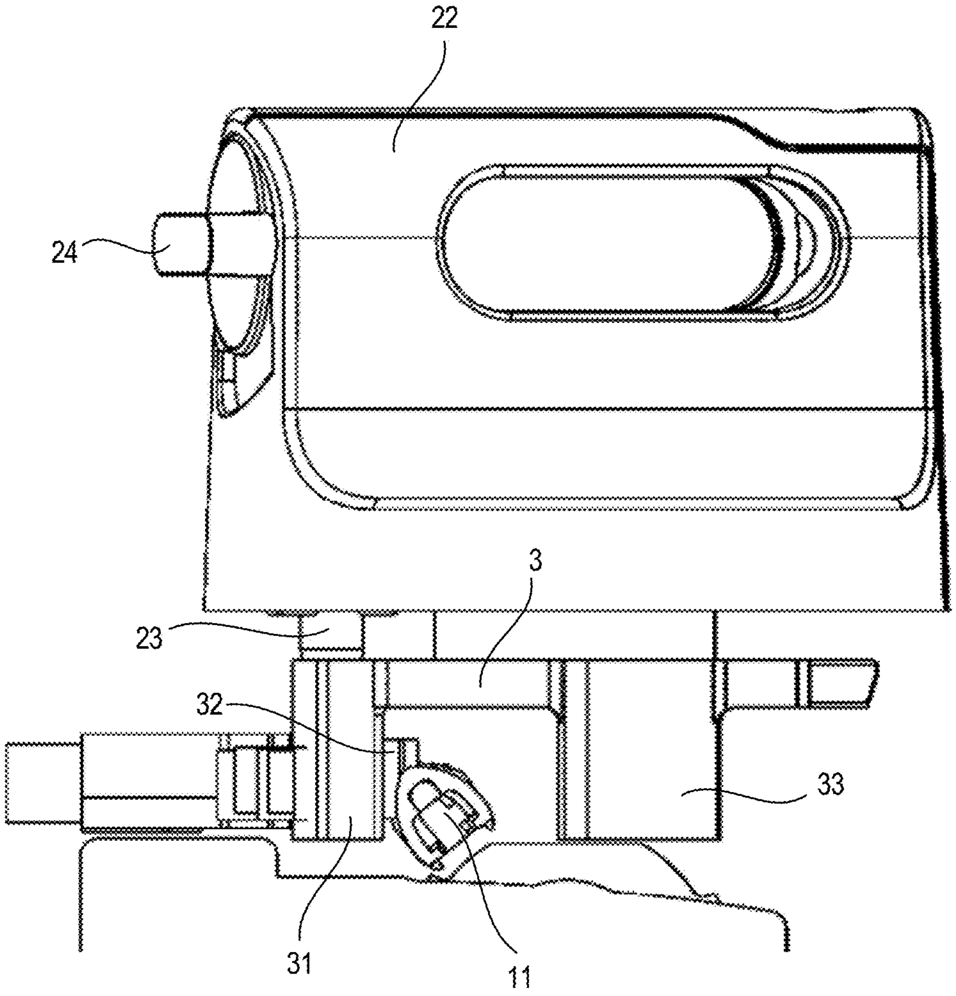
Figure 5C:
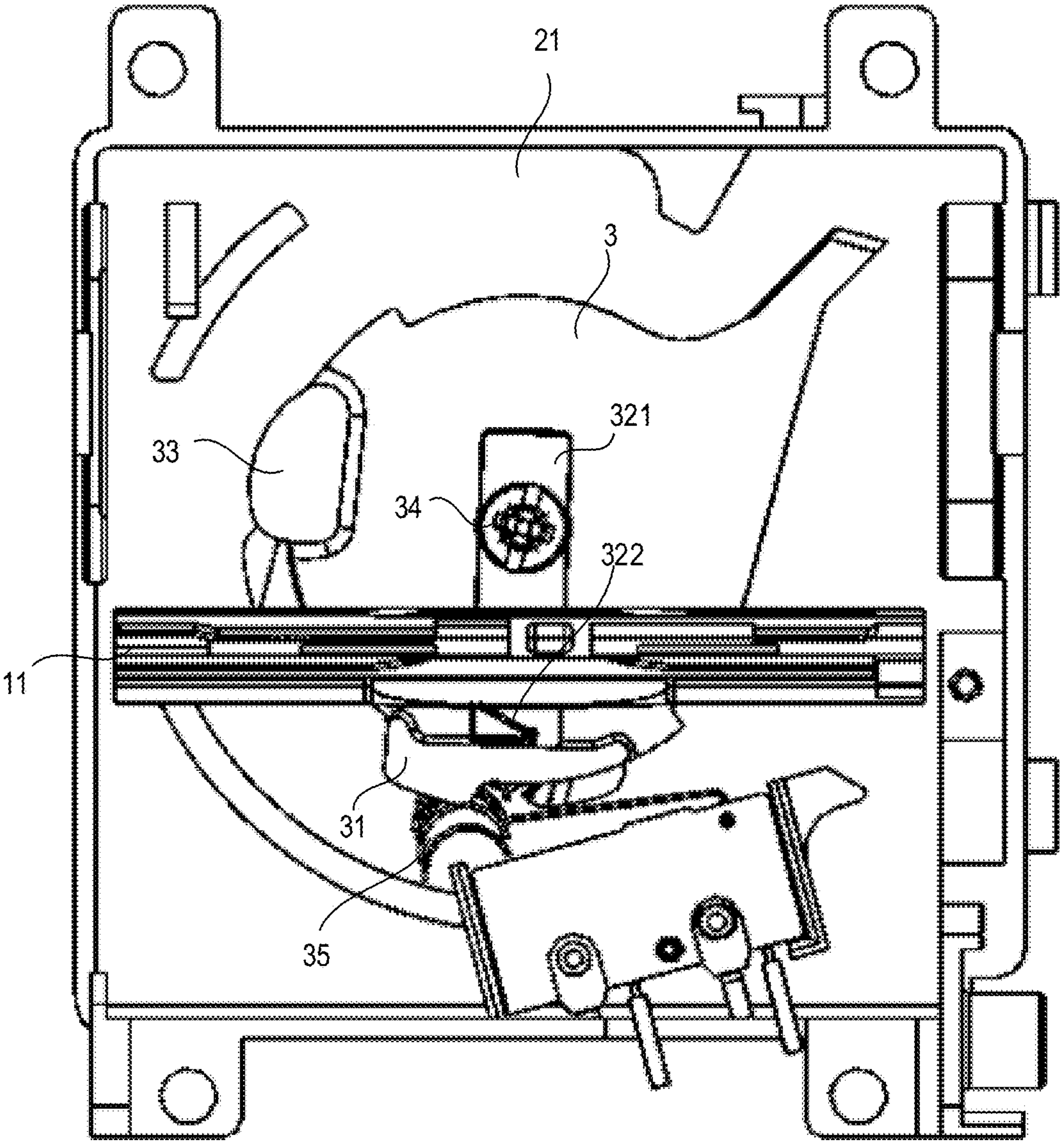

FIGS. 5A, 5B, and 5C respectively show schematic diagrams of the positional relationship between the rotary table and the joystick at different perspectives during the idle movement (i.e., the process in which the first driving block 31 has not yet contacted the joystick 11). As shown in FIGS. 5A, 5B, and 5C, during the idle movement of the rotary table 3, the deforming portion 322 of the elastic member 32 is deformed under the compression of the rotary table 3 and the joystick 11. With the rotation of the rotary table 3, the deforming portion 322 is further compressed to provide greater elastic force to the joystick 11 during the first driving block 31 gradually approaching the joystick 11, and after the first driving block 31 contacts the joystick 11, with the support of the first driving block 3, the deforming portion 322 is no longer compressed by the joystick 11 and the rotary table 3, thereby reducing the situation that the deforming portion 322 is fixedly pressed beyond the elastic deformation range, thereby causing damage to the deforming portion 322.

As shown in FIG. 5C, in some embodiments, the reset module further comprises a microswitch 35 for indicating that the joystick is in the on position. The microswitch is coupled within the housing 21 and is adapted to be triggered when the rotary table 3 is rotated to the closed position. For example, the triggering feature of the microswitch 35 is arranged close to the first driving block 31 of the inner rotary table 3. During the rotary table 3 being in the closed position, the first driving block 31 enables the microswitch to be effectively triggered. During the rotation of the rotary table 3 from the closed position to the open position, and when the first driving block 31 approaches the joystick 11 (i.e., the rotary table 3 is in the idle stroke range), due to the position change of the first driving block 31, the triggering for the microswitch 35 is gradually released, so that the microswitch 35 no longer outputs a triggering signal indicating that the joystick is in the on position or outputs a non-triggering signal indicating that the joystick has left the on position. The microswitch 35 may also be used to control other indicators, such as LED lights, to issue corresponding status indications after sensing the movement of the rotary table 3.

In some alternative embodiments, the triggering feature of the microswitch 35 may also be arranged at other positions on the rotary table 3. For example, a portion of the triggering feature of the microswitch 35 is arranged on the circumferential surface of the rotary table 3, and the other portion is arranged in the housing 21 of the handle mechanism 2. When the rotary table 3 is rotated, the microswitch 35 can sense the movement accordingly and controls the indicator to issue a corresponding status indication.

In some embodiments, the reset module further comprises a second driving block 33 coupled to the rotary table 3. The second driving block 33 is arranged at the circumferential edge of the rotary table 3 and spaced apart from the first driving block 31 by a predetermined distance. When the handle mechanism 2 is coupled to the circuit breaker 1, the joystick 11 of the circuit breaker 1 is located between the first driving block 31 and the second driving block 33. In some other embodiments, the second driving block 33 may also be arranged at other suitable positions of the rotary table 3 that are offset from the axis (i.e., the rotary axis). When the rotary axis of the rotary table 3 is rotated, the second driving block 33 changes position relative to the rotary axis and pushes against the joystick 11 of the circuit breaker 1 to cause the joystick to swing.

Figure 6A:
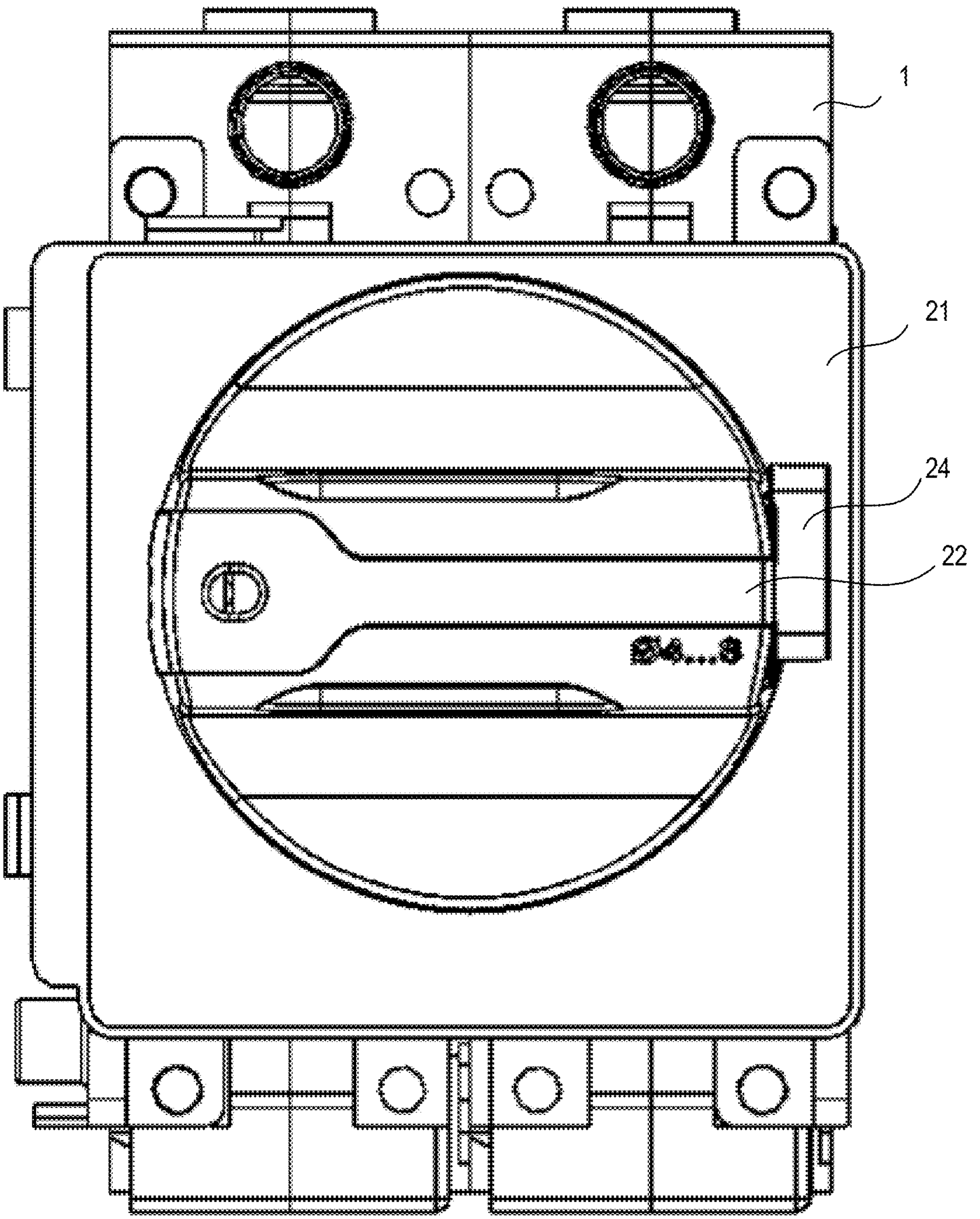
FIGS. 6A, 6B, and 6C respectively show schematic diagrams of the positional relationship between the rotary table and the joystick at different perspectives when the rotary table of the reset module according to embodiments of the present disclosure is in the off position.
Figure 6B:
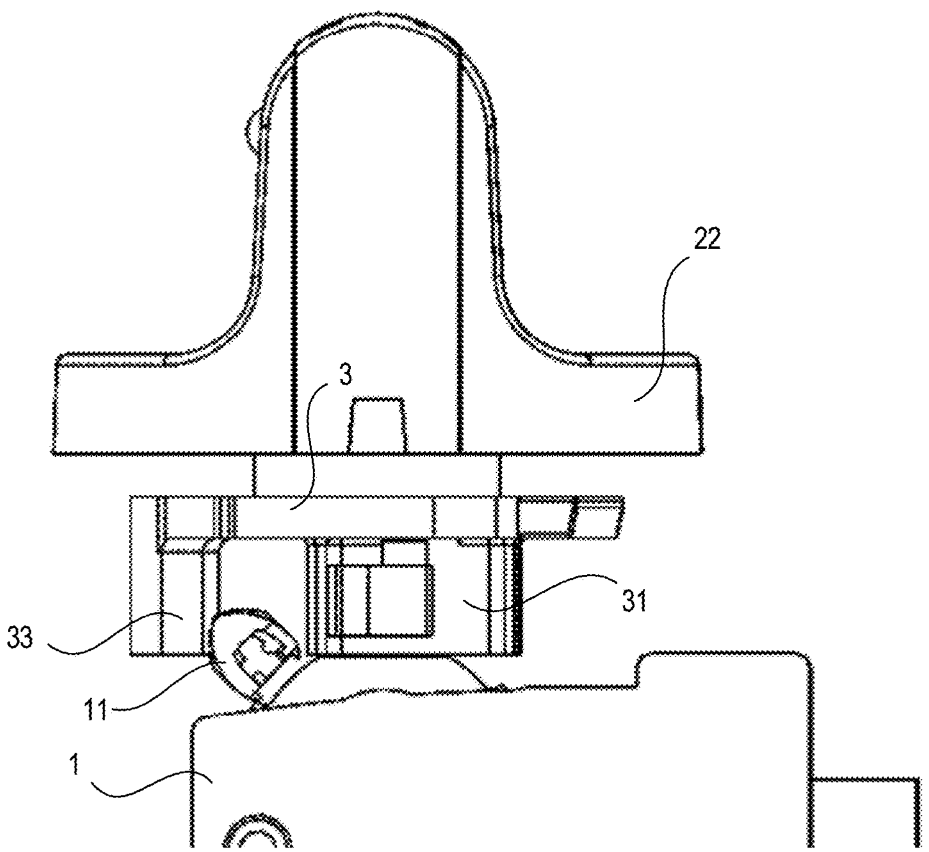
Figure 6C:
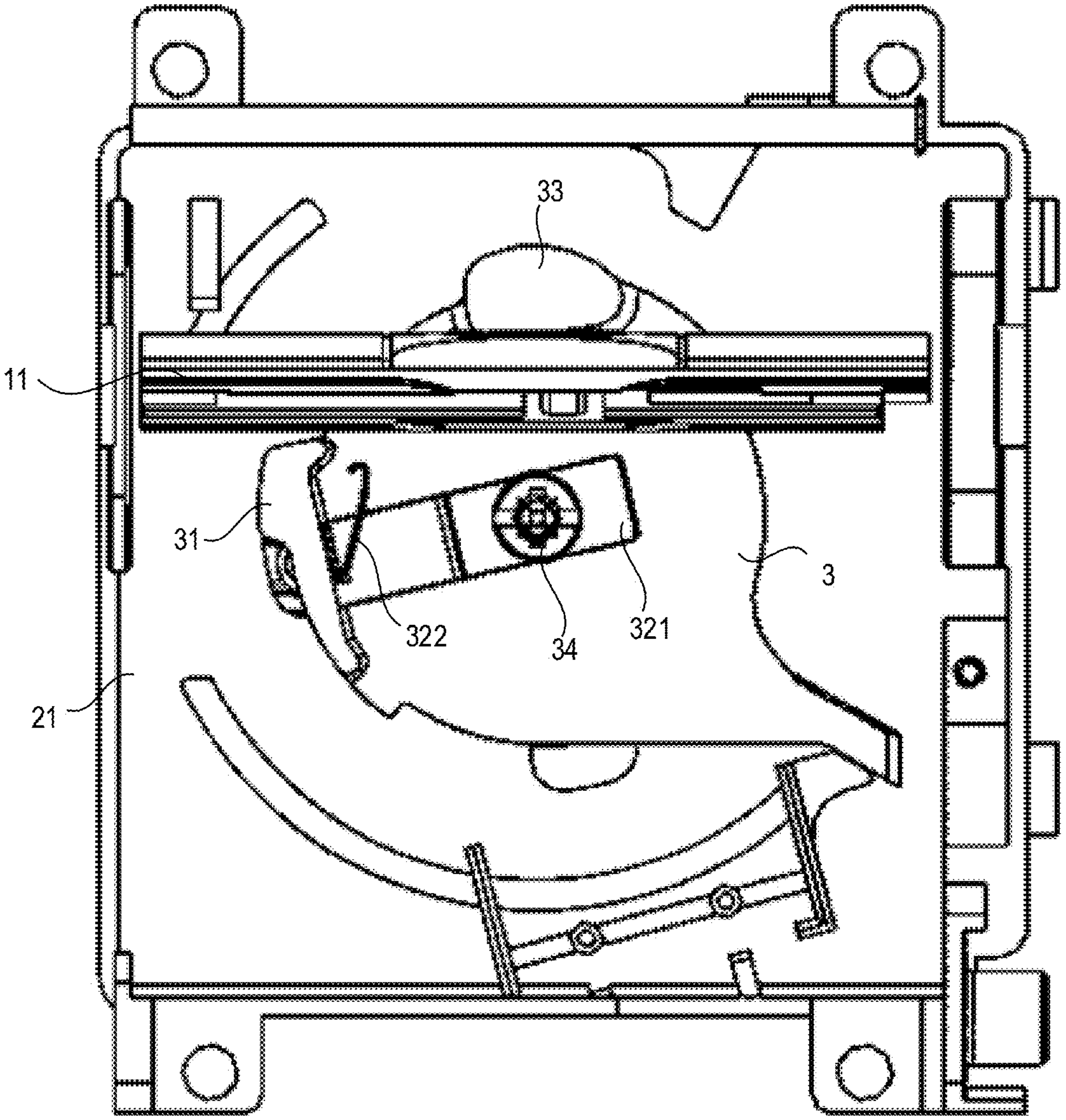

FIGS. 6A, 6B, and 6C respectively show schematic diagrams of the positional relationship between the rotary table and the joystick at different perspectives when the rotary table of the reset module according to embodiments of the present disclosure is in the open position. As shown in FIGS. 6A, 6B, and 6C and referring to FIGS. 5A, 5B, and 5C, when a user needs the handle mechanism 2 to control the circuit breaker 1 to perform the off operation, the user operates the handle mechanism 2 to rotate from the closed position to the open position. When the first driving block 31 pushes against the joystick 11 and causes the joystick 11 to reach the critical position, the joystick 11 is automatically swung to the off position under the drive of the internal mechanism of the circuit breaker 1. During the swinging of the joystick 11 from the critical position to the off position, the joystick 11 contacts the second driving block 33, and the joystick 11 pushes the second driving block 33, while the second driving block 33 drives the rotary table 3 to rotate to the open position. Thus, the handle mechanism 2 completes the operation of controlling the circuit breaker 1 to turn off.

When a user needs the circuit breaker 1 to be turned on using the handle mechanism 2, the user rotates the rotary handle 22 to cause the second driving block 33 to press the joystick 11 to swing from the off position to the critical position, and then the joystick 11 is automatically swung to the on position under the drive of the internal mechanism of the circuit breaker 1. During this period, the joystick 11 presses the first driving block 31, so that the first driving block 31 drives the rotary table 3 to rotate.

By providing the elastic member 32, in the case where the joystick 11 is in the on position, the rotary table 3 can be accurately in the closed position under the electrical force of the elastic member 32, thereby improving the accuracy of the status indication of the circuit breaker 1 by the handle mechanism 2.

Referring back to FIG. 3, in some embodiments, the coupling portion 321 and the deforming portion 322 of the elastic member 32 may be integrally formed. For example, the coupling portion 321 and the deforming portion 322 may be formed by bending the same profile. In other embodiments, the coupling portion 321 and the deforming portion 322 may also be secured together by welding, snap or the like.

In some embodiments, the coupling portion 321 is arranged so that an end thereof is coupled to the axis of the rotary table 3, the other end extends in the radial direction of the rotary table 3. The deforming portion 322 is arranged near the end of coupling portion 321 away from the axis of the rotary table 3 and perpendicular to the extending direction of the coupling portion 321.

As shown in FIG. 3, in some embodiments, the coupling portion 321 may be coupled to the rotary table 3 by a fastener 34. For example, the fastener 34 may be a self-tapping bolt. The self-tapping bolt may be passed through the coupling portion 321 and the rotary table 3 and engaged with the rotary handle 22 with threads. The coupling portion 321 and the rotary handle 22 are fixed with the pressure when the self-tapping bolt is threaded with the rotary handle 22 and the rotary table 3.

As shown in FIG. 3, in some embodiments, the rotary table 3 is also provided with a fixing groove 30 for receiving the coupling portion 321. The fixing groove 30 passes through the center of the rotary table 3 and extends in a mirroring direction toward the first driving block 31. The coupling portion 321 is embedded in the fixing groove 30 and is fixed by the fastener 34. In this way, the coupling stability of the coupling portion 321 and the rotary table 3 is improved, and the situation where the rotary handle 22 indicates an inaccurate state due to the coupling part 321 rotating around the fastener 34 is reduced.

The above has described the various implementations of the present disclosure. The above description is exemplary, not exhaustive, and is not limited to the various implementations disclosed. Without departing from the scope and spirit of the various implementations described, many modifications and changes will be apparent to those skilled in the field. The terminology used in this article is intended to best explain the principles, practical applications, or improvements to the technology in the market, or to enable other ordinary technicians in the field to understand the various implementations disclosed in this article.

We claim:

1. A reset module for a handle mechanism, comprising:
- a housing;
- a rotary handle rotatably coupled to an outside of the housing;
- a rotating table fixedly coupled to the rotary handle and adapted to rotate with the rotary handle about a rotary axis at least between a closed position and an open position;
- a first driving block arranged at a circumferential edge of the rotating table and adapted to contact a joystick of a circuit breaker during rotation of the rotating table from the closed position to the open position and to push the joystick from an on position to an off position for controlling on and off of the circuit breaker; and
- an elastic member coupled to the rotating table and adapted to provide an elastic force between the first driving block and the joystick during the rotating table being in the closed position such that the rotating table is held in the closed position, wherein the elastic member comprises:

a coupling portion fixedly coupled to the rotating table; and a deforming portion coupled to the coupling portion and arranged to press against the joystick at least during the rotating table being in the closed position.

2. The handle mechanism of claim 1, wherein the rotating table further comprises a fixing groove passing through a center of the rotating table and extending radially toward the first driving block, the fixing groove adapted to receive the coupling portion.

3. The reset module handle mechanism of claim 2, further comprising:

a fastener coupled to the coupling portion and configured to couple the coupling portion into the fixing groove.

4. The handle mechanism of claim 3, further comprising:

a second driving block arranged at the circumferential edge of the rotating table and spaced circumferentially by a predetermined angle from the first driving block, the second driving block adapted to contact the joystick during rotation of the rotating table from the open position to the closed position and to push the joystick from the off position to the on position.

5. The handle mechanism of claim 4, wherein the fastener passes simultaneously through the rotating table and the rotary handle, and is respectively coupled to the rotating table and the rotary handle to fix the rotating table on the rotary handle.

6. The handle mechanism of claim 1, further comprising:

a microswitch coupled to the housing and adapted to be triggered by the first driving block during the rotating table being in the closed position.

7. The handle mechanism of claim 1, further comprising:

a locking member movably coupled to the rotary handle, the locking member adapted to be driven and at least partially inserted into at least one location hole to secure the rotary handle to a shell.

8. The handle mechanism of claim 7, further comprising:

a driving assembly adapted to control insertion of the locking member into the at least one location hole and comprising:

a rotary knob coupled to the rotary handle; and a driving member coupled between the rotary knob and the locking member, and adapted to drive the locking member to be inserted into the at least one location hole with rotation of the rotary knob.

9. A switching device comprising:

a circuit breaker comprising a joystick for controlling on and off of the circuit breaker; and a handle mechanism, the handle mechanism comprising:

a housing;

a rotary handle rotatably coupled to an outside of the housing;

a rotating table fixedly coupled to the rotary handle and adapted to rotate with the rotary handle about a rotary axis at least between a closed position and an open position;

a first driving block arranged at a circumferential edge of the rotating table and adapted to contact the joystick during rotation of the rotating table from the closed position to the open position and to push the joystick from an on position to an off position; and an elastic member coupled to the rotating table and adapted to provide an elastic force between the first driving block and the joystick during the rotating table being in the closed position such that the rotating table is held in the closed position, wherein the elastic member comprises:

a coupling portion fixedly coupled to the rotating table; and a deforming portion coupled to the coupling portion and arranged to press against the joystick at least during the rotating table being in the closed position.

10. The switching device of claim 9, wherein the rotating table further comprises a fixing groove passing through a center of the rotating table and extending radially toward the first driving block, the fixing groove adapted to receive the coupling portion.

11. The switching device of claim 10, wherein the handle mechanism further comprises:

a fastener coupled to the coupling portion and configured to couple the coupling portion into the fixing groove.

12. The switching device of claim 11, wherein the handle mechanism further comprises:

a second driving block arranged at the circumferential edge of the rotating table and spaced circumferentially by a predetermined angle from the first driving block, the second driving block adapted to contact the joystick during rotation of the rotating table from the open position to the closed position and to push the joystick from the off position to the on position.

13. The switching device of claim 12, wherein the fastener passes simultaneously through the rotating table and the rotary handle, and is respectively coupled to the rotating table and the rotary handle to fix the rotating table on the rotary handle.

14. The switching device of claim 9, wherein the handle mechanism further comprises:

a microswitch coupled to the housing and adapted to be triggered by the first driving block during the rotating table being in the closed position.

15. The switching device of claim 9, wherein the handle mechanism further comprises:

a locking member movably coupled to the rotary handle, the locking member adapted to be driven and at least partially inserted into at least one location hole to secure the rotary handle to a shell.

16. The switching device of claim 15, wherein the handle mechanism further comprises:

a driving assembly adapted to control insertion of the locking member into the at least one location hole and comprising:

a rotary knob coupled to the rotary handle; and a driving member coupled between the rotary knob and the locking member, and adapted to drive the locking member to be inserted into the at least one location hole with rotation of the rotary knob.

* * * * *